US012441025B2

(12) United States Patent
Wegner et al.

(10) Patent No.: US 12,441,025 B2
(45) Date of Patent: Oct. 14, 2025

(54) ADJUSTABLE MAGNETIC SUPPORT STAND FOR PALLET

(71) Applicant: HAWKEYEPEDERSHAAB CONCRETE TECHNOLOGIES, INC., Clayton, MO (US)

(72) Inventors: James C. Wegner, New Hampton, IA (US); Troy Alan Rewerts, Waverly, IA (US)

(73) Assignee: HAWKEYEPEDERSHAAB CONCRETE TECHNOLOGIES, INC., St. Louis, MO (US)

(*) Notice: Subject to any disclaimer, the term of this patent is extended or adjusted under 35 U.S.C. 154(b) by 107 days.

(21) Appl. No.: 18/420,484

(22) Filed: Jan. 23, 2024

(65) Prior Publication Data

US 2025/0236048 A1 Jul. 24, 2025

(51) Int. Cl.

| | |
|---|---|
| ***B28B 7/00*** | (2006.01) |
| ***B28B 7/02*** | (2006.01) |
| ***B28B 7/18*** | (2006.01) |

(52) U.S. Cl.

CPC ................ *B28B 7/02* (2013.01); *B28B 7/002* (2013.01); *B28B 7/18* (2013.01)

(58) Field of Classification Search

CPC .............. B28B 7/002; B28B 7/02; B28B 7/18

See application file for complete search history.

(56) References Cited

U.S. PATENT DOCUMENTS

| | | | | |
|---|---|---|---|---|
| 1,983,757 | A * | 12/1934 | Hick | B28B 7/168 277/924 |
| 2,955,341 | A * | 10/1960 | Sinclair | B28B 7/168 249/97 |
| 4,756,861 | A * | 7/1988 | Schultz | B28B 21/16 425/432 |
| 2018/0215072 | A1* | 8/2018 | Del Zotto | B28B 5/04 |

* cited by examiner

*Primary Examiner* — James Sanders
(74) *Attorney, Agent, or Firm* — SHUTTLEWORTH & INGERSOLL, PLC; Jason R. Sytsma

(57) ABSTRACT

A sub-base; an inner mold positioned on the sub-base; a pallet positioned around the inner mold and adjustable along the inner mold; and an adjustable magnetic support stand for supporting the pallet around the inner mold and positioned on the sub-base.

9 Claims, 3 Drawing Sheets

ADJUSTABLE MAGNETIC SUPPORT STAND FOR PALLET

TECHNICAL FIELD

This disclosure relates to the manufacture of concrete pipes, more specifically, this disclosure is directed to a magnet support stand for a pallet used in forming joints and transporting hollow concrete products.

BACKGROUND INFORMATION

Hollow concrete products, such as concrete pipes, manholes, culverts, and boxes are manufactured by casting a concrete mixture or slurry in a mold. The mold generally requires a sub-base, an inner mold, an outer jacket, and a pallet. The pallet is mounted around inner mold and supported on the sub-base by jacks at the appropriate height corresponding to the length of the concrete product. In this way, a single mold can be used to make concrete products of different lengths or heights. The outer jacket is fitted around the pallet. The space between the inner mold and outer jacket of the form constitutes the cavity in which the concrete slurry is poured. When the slurry has sufficiently cured, the outer jacket is removed and the concrete product can be removed from the inner mold.

Various types of jacks and support stands have been used to position the pallet at the appropriate height. Adjustable jacks have been used but these have not been attachable to the form. Some manufacturers have even used wooden posts taped, magnetized, or otherwise secured to the side wall of the inner mold. These prior methods, however, are unsafe. With the jacks simply placed in position they can easily slip out. Wooden posts, no matter, how secured to the sidewall of the inner mold are inherently unreliable and unsafe. They could have hidden cracks or defects causing failure under load.

Accordingly, there is a need for an engineered adjustable magnetic support stand for a pallet that will hold the stand secure to a sub-base of the form.

SUMMARY

In accordance with one aspect of the present invention, a concrete forming system comprising a sub-base, an inner mold positioned on the sub-base, a pallet positioned around the inner mold and adjustable along the inner mold, and an adjustable magnetic support stand for supporting the pallet around the inner mold and positioned on the sub-base.

In an embodiment, the adjustable magnetic support stand further comprises: a housing comprising a hollow tube with an opening oriented upward, at least one receiving hole or a plurality of receiving holes oriented vertically and extending incrementally along the hollow tube of the housing, and a foot extending perpendicularly from a bottom of the housing; a leg positioned in the hollow tube of the housing comprising at least one receiving hole or a plurality of receiving holes oriented vertically and extending incrementally along the leg; a removable pin for positioning through one of the plurality of receiving holes of the hollow tube and one of the receiving holes of the leg to set a vertical height of the stand; and a magnet attached to the housing and adapted for holding the stand in position.

In an embodiment, the magnet is attached to the foot of the housing. In other embodiments, the magnet is attached to the hollow tube. In the former, the bottom of the magnet constitutes a portion of a bottom of the stand such that the magnet is adaptable to secure the stand to the sub-base.

In an embodiment, the housing comprises a foot for sturdy support of the housing. The foot can comprise two plates positioned apart from each other and a mounting bracket extending in between. The magnet is attachable to the mounting bracket and positioned between the two plates.

In an embodiment, a plurality of legs each having different lengths that are each removable and replaceable with respect to the hollow tube of the housing are provided to provide a gross adjustment of the vertical height of the stand. Fine adjustment is provided by a plurality of receiving holes oriented along the legs that align with receiving holes in the hollow tube of the housing.

In an embodiment, the hollow tube of the housing further comprises two handles oriented parallel to the hollow tube and on opposite sides of the receiving holes for convenience.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 2:
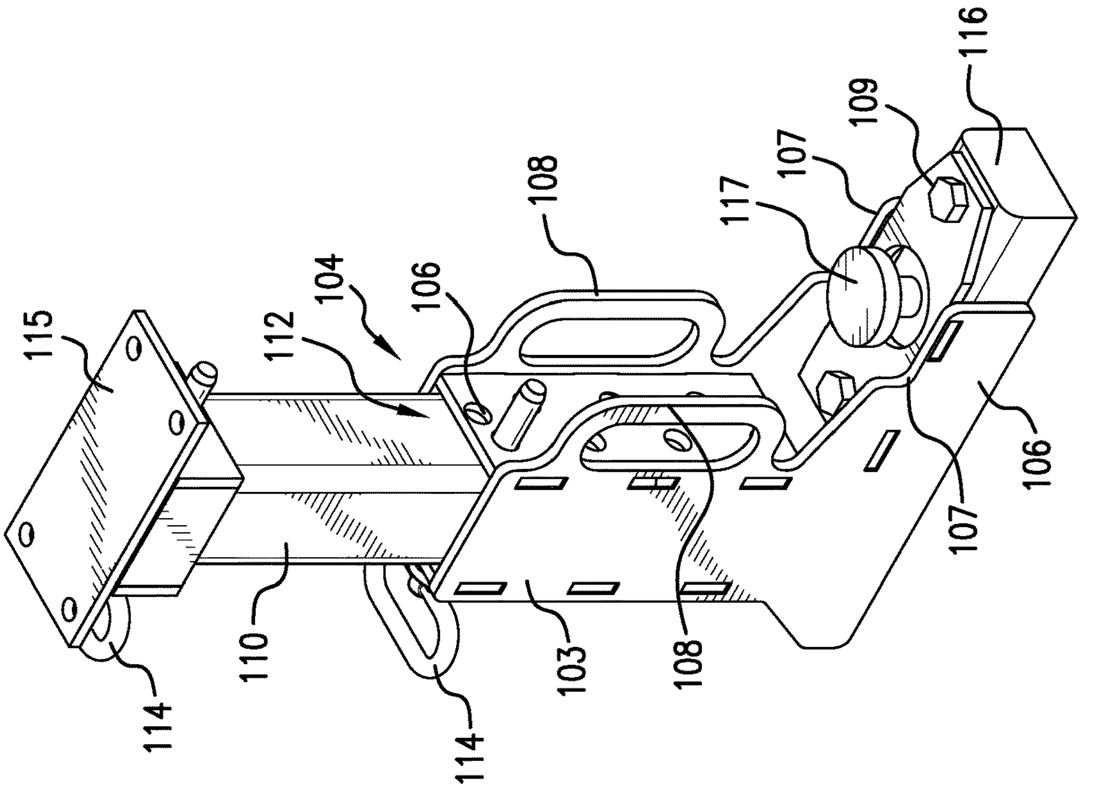
FIG. 2 is a perspective view of the stand of FIG. 1 in an extended position.
Figure 1:
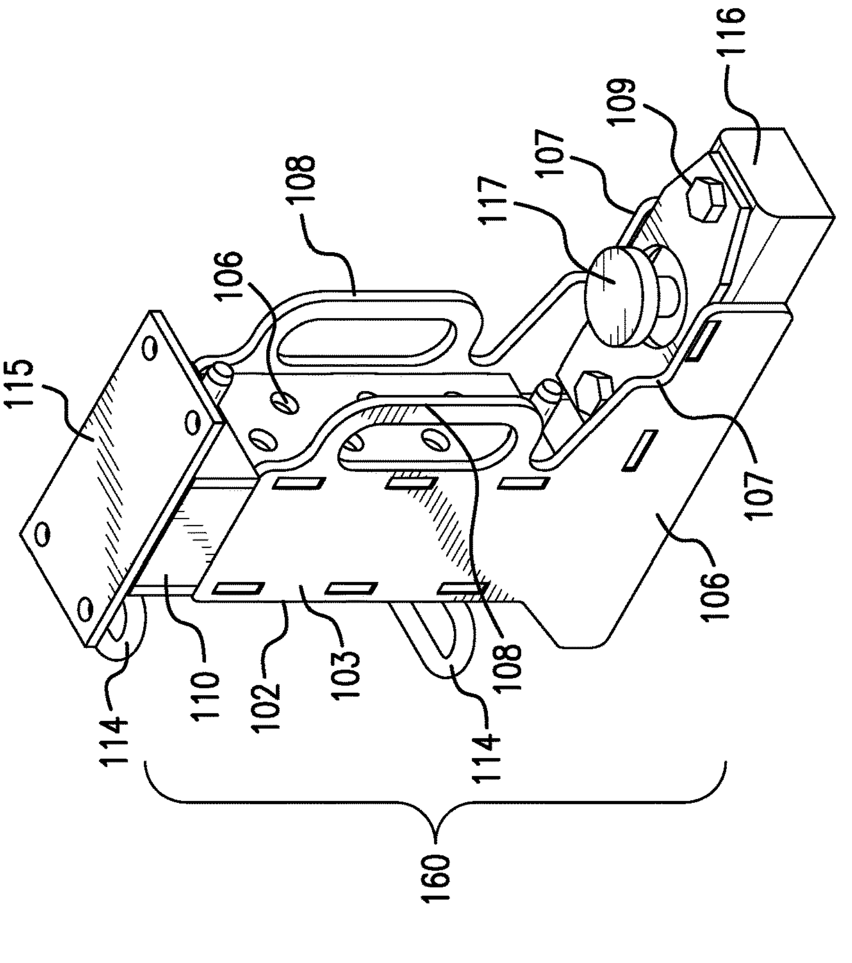
FIG. 1 is a perspective view of an adjustable magnetic support stand for a pallet according to this disclosure.
Figure 4:
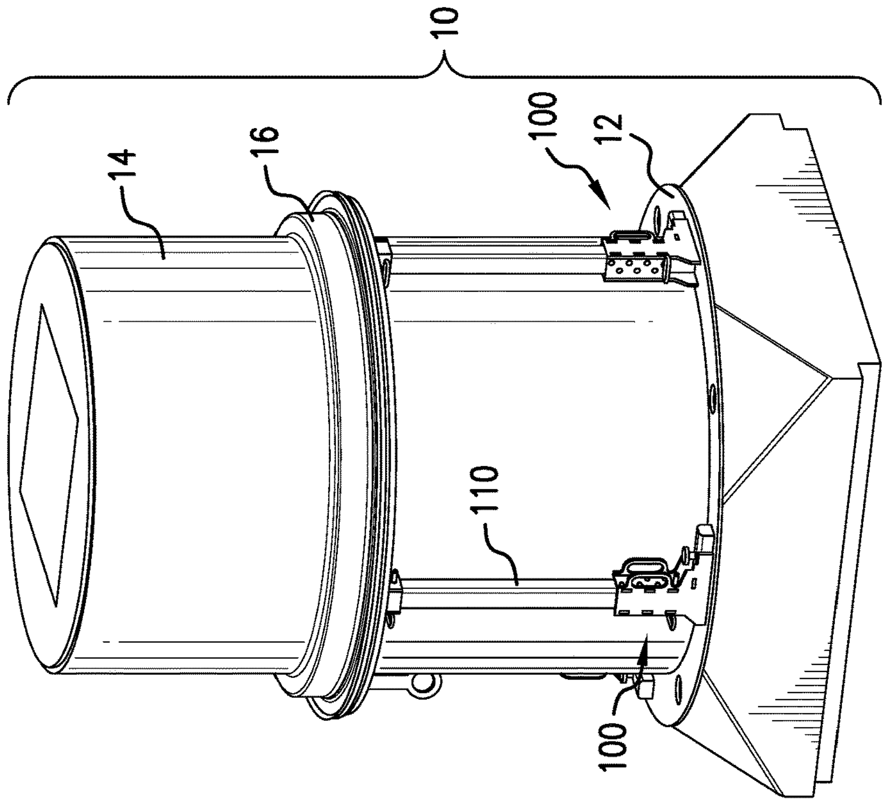
FIG. 4 is a perspective view of a stand with a longer leg positioned in the extended position and attached to the sub-base and supporting a pallet.
Figure 3:
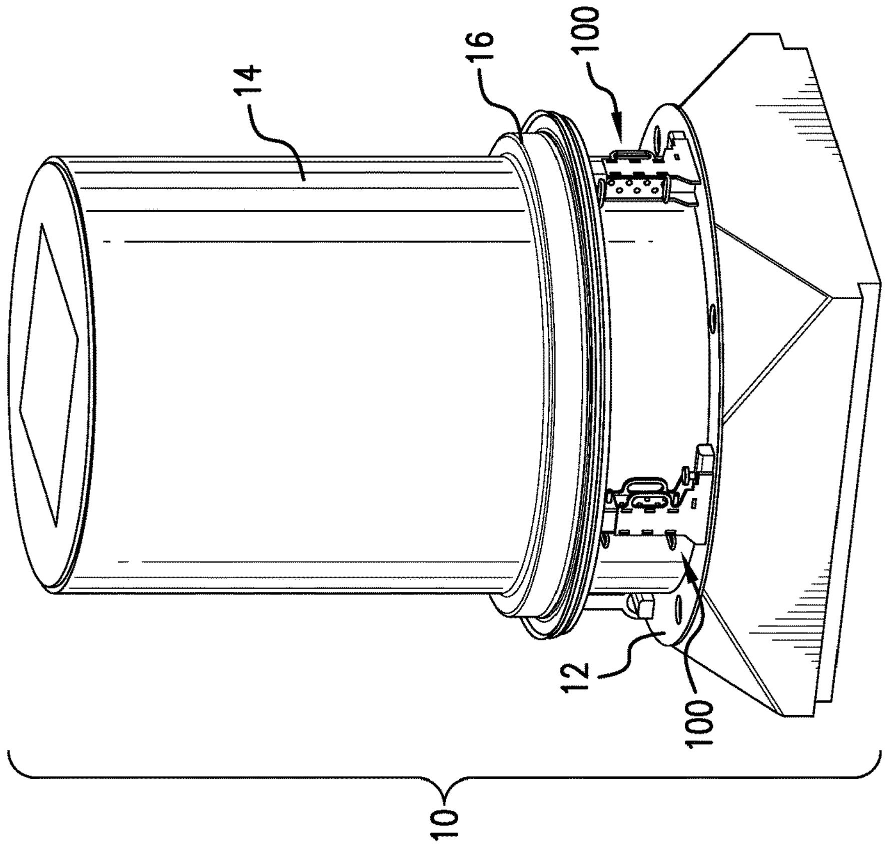
FIG. 3 is a perspective view of the stand of FIG. 1 attached to the sub-base and supporting a pallet.
Figure 5:
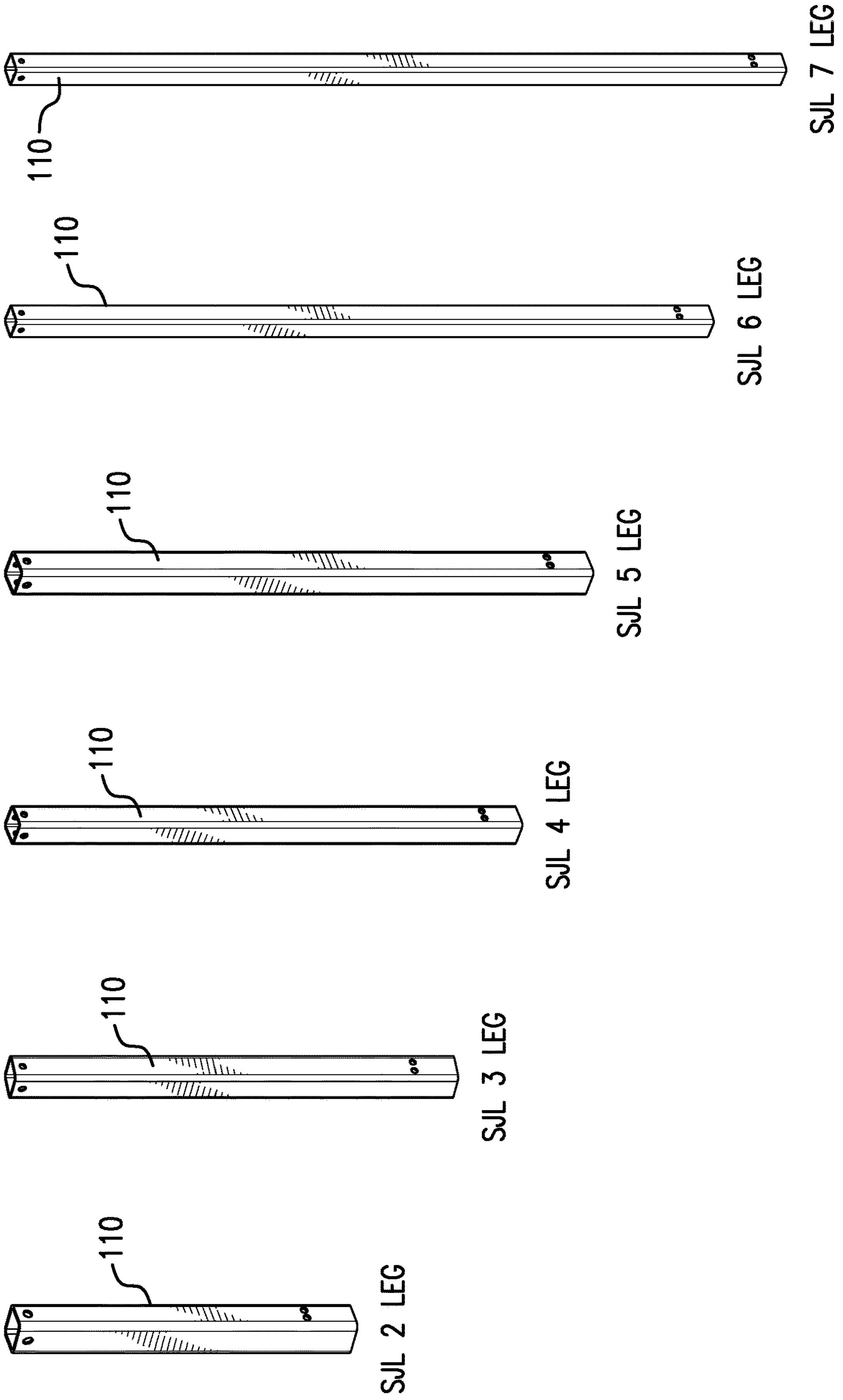
FIG. 5 is a perspective view of the plurality of legs interchangeable legs.

Disclosed herein is a concrete forming system 10 for manufacturing hollow concrete products, such as concrete pipes, manholes, culverts, and boxes, or where forming other precast products is required. Referring to FIGS. 3-5, shown is a concrete forming system 10 comprising a sub-base 12, an inner mold 14 positioned on the sub-base 12, a pallet 16 positioned around the inner mold 12 and adjustable along the inner mold 12, and an adjustable magnetic support stand 100 for supporting the pallet 16 around the inner mold 14 and positioned on the sub-base 12. In operation, support stand 100 is set to the required height to position pallet 16 at the appropriate position corresponding to the desired length of the concrete product. An outer jacket that forms the outer sidewalls of the concrete product is positioned on pallet 16. The space between inner mold 14 and the outer jacket constitutes the cavity in which the concrete slurry is poured. When the slurry has sufficiently cured, the outer jacket is removed and the concrete product can be removed from inner mold 14.

As will be discussed in more detail below, support stand 100 is magnetically attached to either inner mold 12 or, as illustrated, to sub-base 12 to firmly hold support stand 100 in position during the production process. The firm positioning of support stand 100 offers safety advantages not found in the prior art.

More specifically, adjustable magnetic support stand 100 comprises a housing 102 with a hollow tube 103 with an opening 104 oriented upward, a plurality of receiving holes 106 oriented vertically and extending incrementally along hollow tube 103 of housing 102, and a foot 106 extending perpendicularly from a bottom of housing 102. A handle 108 or two handles 108 oriented parallel to the hollow tube and on opposite sides of receiving holes 106 can provided for convenience. Housing 102 is supported by foot 106. Foot 106 of housing 102 can be formed by two plates 107 positioned apart from each other and a mounting bracket 109 extending in between.

Those skilled in the art will recognize that the shape of hollow tube 103 is not critical. It can be formed of rectangular tubing, as shown, round, or other shapes. Foot 106 can similarly be implemented with different shapes and orientations that provide a firm self-standing and stable structure. Plurality of receiving holes 106 are spaced apart in increments allowing for fine adjustment of the overall height of stand 100. Ideally, plurality of receiving holes 106 are spaced apart in one inch increments to accommodate to the various lengths of concrete products, but other increments are contemplated.

A leg 110 with an upward facing plate 115 at the top of leg 110 is positioned in hollow tube 103 of housing 102. Leg 110 comprises at least one receiving hole 112 oriented vertically and extending incrementally along leg 110. A removable pin 114 for positioning through one of the plurality of receiving holes 106 of hollow tube 103 and one of receiving holes 114 of leg 110 sets a vertical height of stand 100. At least one receiving hole 112 of leg 110 correspond in positioning to align with receiving holes 106 of hollow tube 103. This arrangement allows leg 110 to be moved up and down out of hollow tube 103 for fine adjusting the height of the stand 100. In a preferred embodiment, stand 100 has a 12" overall height with adjustment of leg 110 to make stand 100 up to 18" tall adjustable in 1" increments therebetween.

One skilled in the art will recognize that the only one of hollow tube 103 and leg 110 needs to have a plurality of vertically oriented, incremental receiving holes to provide fine adjustment. This means that plurality of receiving holes spaced apart in increments allowing for fine adjustment of the overall height of stand 100 can be on leg 110 instead of hollow tube 103 with only at least one receiving hole on hollow tube 103 of support stand 102.

Gross adjustment of the height of stand 100 is allowed by the provision of a plurality of legs 110 each having different lengths that are each removable and replaceable with respect to hollow tube 103 of housing 102. This means, for example, if a longer concrete product is required, a shorter leg 110 can be used (e.g., FIG. 3), and if a shorter concrete product is required, a longer leg 110 can be used (e.g., FIG. 4). By combining plurality of legs 110 with at least one receiving hole 112 oriented vertically and extending incrementally along leg 110, both gross height adjustment by switching out legs 110 and fine adjustment by placing pin 114 in the appropriate corresponding receiving holes 112 can be provided.

In one embodiment, plurality of legs 110 are provided as a kit comprising stand 100. In such an embodiment, the kit can comprise one or more of the following: a 23½" tall leg 103 that adjusts from 24" to 30"; a 35½" tall leg 103 that adjusts from 36" to 42"; a 47½" tall leg that adjusts from 48" to 54"; a 59½" tall leg that adjusts from 60" to 66"; a 71½" tall leg that adjusts from 72" to 78"; and an 83½" tall leg that adjusts from 84" to 90". Combined with the fine adjustment described above, a whole range of motion from 12" through 90" can be provided.

Stand 100 is held in position by a magnet 116 attached to stand 100. In the illustrated embodiment, magnet 116 is attached to housing 102 and adapted for holding stand 100 in position. Further, in the illustrated embodiment, magnet 116 is attached to foot 106 of housing 102. In such an orientation, magnet 116 is positioned between two plates 106 and attached via mounting bracket 109. In this arrangement, bottom of magnet 116 constitutes a portion of a bottom of stand 100 such that magnet 116 is adaptable to secure stand 100 to sub-base 12. Magnet 116 can be attached to foot 106 of housing 102 in various manner to achieve the same result of firmly holding magnet 116 to sub-base 12.

Magnet 116 can be a permanent magnet that requires a large amount of manual effort to remove or an electropermanent magnet with on/off control, as illustrated. In such embodiments, a push button 117 for magnet 116 can be oriented facing upward through a hole in mounting bracket 109. This arrangement allows an operator to easily turn on/off magnet 116 with the push of a button.

Other arrangements are also contemplated; for example, magnet 116 can be attached to a side of hollow tube 103 to firmly hold stand 100 to the side of inner mold 14. Magnet 116 can be secured to housing 102 in a similar manner with extending side plates and a bracket. In alternative embodiments, magnet 116 could also be completely separate from housing 102 so that stand 100 is magnetized to either sub-base 12 or inner mold 14 at any convenient position—the most important requirement being that stand is firmly held in place during the concrete production process.

While the foregoing embodiments are directed to manufacturing hollow concrete products, such as concrete pipes, manholes, culverts, and boxes, or forming other precast products, the manufacture of other products is contemplated. The systems disclosed herein are especially suited for products where various heights or lengths are desirable. Jack 100 allows the manufacturer to set the forming to various heights by the gross and fine adjustments described herein.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

We claim:

1. An adjustable magnetic support stand for supporting a pallet around an inner mold and on a sub-base, the stand comprising:

a housing comprising a hollow tube with an opening oriented upward, at least one receiving hole, and a foot extending perpendicularly from a bottom of the housing;

a leg positioned in the hollow tube of the housing comprising at least one receiving hole;

a removable pin for positioning through the at least one receiving hole of the hollow tube and the at least one receiving hole of the leg to set a vertical height of the stand; and a magnet attached to the housing and adapted for holding the stand in position, wherein the magnet is attached to the foot of the housing, wherein the bottom of the magnet constitutes a portion of a bottom of the stand such that the magnet is adaptable to secure the stand to the sub-base, and wherein the foot of the housing further comprises two plates positioned apart from each other and a mounting bracket extending in between, and wherein the magnet is attachable to the mounting bracket and positioned between the two plates.

2. The stand of claim 1, and further comprising a plurality of legs each having different lengths that are each removable and replaceable with respect to the hollow tube of the housing to provide a gross adjustment of the vertical height of the stand.

3. The stand of claim 1, wherein the hollow tube of the housing further comprises a handle oriented parallel to the hollow tube.

4. The stand of claim 3, wherein the hollow tube of the housing further comprises two handles oriented parallel to the hollow tube and on opposite sides of the at least one receiving hole.

5. A concrete forming system comprising:

a sub-base;

an inner mold positioned on the sub-base;

a pallet positioned around the inner mold and adjustable along the inner mold; and an adjustable magnetic support stand for supporting the pallet around the inner mold and positioned on the sub-base, wherein the adjustable magnetic support stand further comprises:

a housing comprising a hollow tube with an opening oriented upward, at least one receiving hole, and a foot extending perpendicularly from a bottom of the housing;

a leg positioned in the hollow tube of the housing comprising at least one receiving hole;

a removable pin for positioning through the at least one receiving hole of the hollow tube and the at least one receiving hole of the leg to set a vertical height of the stand; and a magnet attached to the housing and adapted for holding the stand in position, wherein the magnet is attached to the foot of the housing, wherein the bottom of the magnet constitutes a portion of a bottom of the stand such that the magnet is adaptable to secure the stand to the sub-base, and wherein the foot of the housing further comprises two plates positioned apart from each other and a mounting bracket extending in between, and wherein the magnet is attachable to the mounting bracket and positioned between the two plates.

6. The stand of claim 5, and further comprising a plurality of legs each having different lengths that are each removable and replaceable with respect to the hollow tube of the housing to provide a gross adjustment of the vertical height of the stand.

7. The stand of claim 5, wherein the hollow tube of the housing further comprises a handle oriented parallel to the hollow tube.

8. The stand of claim 7, wherein the hollow tube of the housing further comprises two handles oriented parallel to the hollow tube and on opposite sides of the at least one receiving hole.

9. A kit of parts for an adjustable magnetic support stand for supporting a pallet around an inner mold and on a sub-base, the kit of parts comprising:

a housing comprising a hollow tube with an opening oriented upward, a plurality of receiving holes oriented vertically and extending incrementally along the hollow tube of the housing, and a foot extending perpendicularly from a bottom of the housing;

a plurality of legs each of which being separately positionable in the hollow tube of the housing and each comprising a plurality of receiving holes oriented vertically and extending incrementally there-along, wherein the plurality of legs further comprises at least two chosen from the group consisting of: a 23½" tall leg that adjusts from 24" to 30"; a 35½" tall leg that adjusts from 36" to 42; a 47½" tall leg that adjusts from 48" to 54"; a 59½" tall leg that adjusts from 60" to 66"; a 71½" tall leg that adjusts from 72" to 78"; and an 83½" tall leg that adjusts from 84" to 90";

a removable pin for positioning through one of the plurality of receiving holes of the hollow tube and one of the receiving holes of each of one of the plurality of legs to set a vertical height of the stand; and a magnet attached to the housing and adapted for holding the stand in position, wherein the magnet is attached to the foot of the housing; wherein the bottom of the magnet constitutes a portion of a bottom of the stand such that the magnet is adaptable to secure the stand to the sub-base; wherein the foot of the housing further comprises two plates positioned apart from each other and a mounting bracket extending in between; and wherein the magnet is attachable to the mounting bracket and positioned between the two plates; and wherein the magnet is an electropermanent magnet with a push button oriented upward and extending through a hole in the mounting bracket.

* * * * *